United States Patent
Kim et al.

(10) Patent No.: US 10,802,636 B2
(45) Date of Patent: Oct. 13, 2020

(54) TOUCH DISPLAY DEVICE, DATA DRIVER CIRCUIT, AND METHOD OF DRIVING CONTROLLER

(71) Applicant: LG Display Co., Ltd., Seoul (KR)

(72) Inventors: HoonBae Kim, Seoul (KR); CheolSe Kim, Daegu (KR); SungChul Kim, Paju-si (KR); SunYeop Kim, Seoul (KR); Seongkyu Kang, Paju-si (KR); SeungMok Shin, Daegu (KR); SungHoon Lee, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/439,544

(22) Filed: Jun. 12, 2019

(65) Prior Publication Data

US 2019/0384437 A1 Dec. 19, 2019

(30) Foreign Application Priority Data

Jun. 15, 2018 (KR) .................. 10-2018-0069145
May 21, 2019 (KR) .................. 10-2019-0059286

(51) Int. Cl.
*G06F 3/041* (2006.01)
*G06F 3/047* (2006.01)
*G06F 3/044* (2006.01)

(52) U.S. Cl.
CPC ............ *G06F 3/0412* (2013.01); *G06F 3/044* (2013.01); *G06F 3/047* (2013.01); *G06F 3/04162* (2019.05)

(58) Field of Classification Search
CPC ........ G06F 3/0412; G06F 3/047; G06F 3/044; G06F 3/04162; G06F 3/04184; G06F 3/0443; G06F 3/0416; G09G 3/3614; G09G 2354/00; G09G 2320/0219
See application file for complete search history.

(56) References Cited

U.S. PATENT DOCUMENTS

| | | | | |
|---|---|---|---|---|
| 9,024,913 B1* | 5/2015 | Jung | ............... | G09G 3/3696 345/174 |
| 2009/0167667 A1* | 7/2009 | Suzuki | ............... | G09G 3/3688 345/96 |
| 2013/0076647 A1 | 3/2013 | Yousefpor et al. | | |
| 2014/0232624 A1* | 8/2014 | Kim | ............... | G09G 3/3614 345/87 |

(Continued)

FOREIGN PATENT DOCUMENTS

| EP | 3301549 A1 | 4/2018 |
|---|---|---|
| JP | 2013-168083 A | 8/2013 |

OTHER PUBLICATIONS

Extended European Search Report, European Patent Application No. 19180000.2, dated Oct. 18, 2019, 7 pages.

*Primary Examiner* — Brent D Castiaux
(74) *Attorney, Agent, or Firm* — Fenwick & West LLP

(57) ABSTRACT

A touch display device and a method of driving the same. A transition value due to polarity inversion of a data voltage supplied to a predetermined number of adjacent subpixels is reduced by varying an inversion pattern by analysis of image data, so that fluctuations in the voltage of touch electrodes due to the transition of the data voltage are minimized. Accordingly, noise due to fluctuations in the voltage of the touch electrodes is removed so as to improve the performance of touch sensing performed in a period in which display driving is performed.

20 Claims, 19 Drawing Sheets

(56) References Cited

U.S. PATENT DOCUMENTS

| | | | |
|---|---|---|---|
| 2015/0145901 A1* | 5/2015 | Lee | G09G 3/3614 |
| | | | 345/691 |
| 2015/0339988 A1 | 11/2015 | Kurasawa et al. | |
| 2016/0062505 A1* | 3/2016 | Hwang | G06F 3/0414 |
| | | | 345/174 |
| 2016/0098116 A1 | 4/2016 | Park et al. | |
| 2018/0059832 A1 | 3/2018 | Cho et al. | |

* cited by examiner

FIG.8

<Initial PTN>

Data Level and POL

| | + | − | + | − | + | − | | | | | | | | Total |
|---|---|---|---|---|---|---|---|---|---|---|---|---|---|---|
| 1st Line | 11 | 5 | 11 | 5 | 11 | 5 | | | | | | | | |
| 2nd Line | 6 | 0 | 6 | 0 | 6 | 0 | 5 | 5 | 5 | 5 | 5 | 5 | | 30 |
| 3rd Line | 11 | 5 | 11 | 5 | 11 | 5 | −5 | −5 | −5 | −5 | −5 | −5 | | −30 |
| 4th Line | 6 | 0 | 6 | 0 | 6 | 0 | 5 | 5 | 5 | 5 | 5 | 5 | | 30 |
| 5th Line | 11 | 5 | 11 | 5 | 11 | 5 | −5 | −5 | −5 | −5 | −5 | −5 | | −30 |
| 6th Line | 6 | 0 | 6 | 0 | 6 | 0 | 5 | 5 | 5 | 5 | 5 | 5 | | 30 |

Transition

FIG.9

<Inversion Case>

| | | | | |
|---|---|---|---|---|
| CASE #1 | + | + | − | − |
| CASE #2 | − | − | + | + |
| CASE #3 | + | − | + | − |
| CASE #4 | − | + | − | + |
| CASE #5 | + | − | − | + |
| CASE #6 | − | + | + | − |

FIG.10

1st Line

| Initial Value | 11 | 5 | 11 | 5 |
|---|---|---|---|---|

2nd Line Case

|  |  |  |  |  | | | | | 1st – 2nd | | | | | Total |
|---|---|---|---|---|---|---|---|---|---|---|---|---|---|---|
| CASE #1 | 6 | 11 | 5 | 0 | | CASE #1 | 5 | -6 | 6 | 5 | 10 |
| CASE #2 | 5 | 0 | 6 | 11 | | CASE #2 | 6 | 5 | 5 | -6 | 10 |
| CASE #3 | 6 | 0 | 6 | 0 | | CASE #3 | 5 | 5 | 5 | 5 | 20 |
| CASE #4 | 5 | 11 | 5 | 11 | | CASE #4 | 6 | -6 | 6 | -6 | 0 |
| CASE #5 | 6 | 0 | 5 | 11 | | CASE #5 | 5 | 5 | -6 | -6 | 10 |
| CASE #6 | 5 | 11 | 6 | 0 | | CASE #6 | 6 | -6 | 5 | 5 | 10 |

2nd Line

| Initial Value | 5 | 11 | 5 | 11 |
|---|---|---|---|---|

3rd Line Case

|  |  |  |  |  | | | | | 2nd – 3rd | | | | | Total |
|---|---|---|---|---|---|---|---|---|---|---|---|---|---|---|
| CASE #1 | 11 | 6 | 0 | 5 | | CASE #1 | -6 | 5 | 5 | 6 | 10 |
| CASE #2 | 0 | 5 | 11 | 6 | | CASE #2 | 5 | 6 | -6 | 5 | 10 |
| CASE #3 | 11 | 5 | 11 | 5 | | CASE #3 | -6 | 6 | -6 | 6 | 0 |
| CASE #4 | 0 | 6 | 0 | 6 | | CASE #4 | 5 | 5 | 5 | 5 | 20 |
| CASE #5 | 11 | 5 | 0 | 6 | | CASE #5 | -6 | 6 | 5 | 5 | 10 |
| CASE #6 | 0 | 6 | 11 | 5 | | CASE #6 | 5 | 5 | -6 | 6 | 10 |

FIG.11

⟨Changed PTN1⟩

Based on Data Level

|  | | | | | | | | | | | | Total |
|---|---|---|---|---|---|---|---|---|---|---|---|---|
| 1st Line | 11 | 5 | 11 | 5 | | | | | | | | |
| 2nd Line | 5 | 11 | 5 | 11 | | 6 | -6 | 6 | -6 | | | 0 |
| 3rd Line | 11 | 5 | 11 | 5 | | -6 | 6 | -6 | 6 | | | 0 |
| 4th Line | 5 | 11 | 5 | 11 | | 6 | -6 | 6 | -6 | | | 0 |
| 5th Line | 11 | 5 | 11 | 5 | | -6 | 6 | -6 | 6 | | | 0 |
| 6th Line | 5 | 11 | 5 | 11 | | 6 | -6 | 6 | -6 | | | 0 |

Transition ↓

Based on POL

| | | | | | | |
|---|---|---|---|---|---|---|
| 1st Line | + | - | + | - | | CASE #3 |
| 2nd Line | - | + | - | + | | CASE #4 |
| 3rd Line | + | - | + | - | | CASE #3 |
| 4th Line | - | + | - | + | | CASE #4 |
| 5th Line | + | - | + | - | | CASE #3 |
| 6th Line | - | + | - | + | | CASE #4 |

FIG.12

Calculation of 1st Line according to Cases

|  |  |  |  |  | AVE |
|---|---|---|---|---|---|
| CASE #1 | 11 | 6 | 0 | 5 | 5.5 |
| CASE #2 | 0 | 5 | 11 | 6 | 5.5 |
| CASE #3 | 11 | 5 | 11 | 5 | 8 |
| CASE #4 | 0 | 6 | 0 | 6 | 3 |
| CASE #5 | 11 | 5 | 0 | 6 | 5.5 |
| CASE #6 | 0 | 6 | 11 | 5 | 5.5 |

TOUCH DISPLAY DEVICE, DATA DRIVER CIRCUIT, AND METHOD OF DRIVING CONTROLLER

CROSS REFERENCE TO RELATED APPLICATIONS

This application claims priority to Republic of Korea Patent Application No. 10-2018-0069145, filed in the Republic of Korea on Jun. 15, 2018, and Republic of Korea Patent Application No. 10-2019-0059286, filed in the Republic of Korea on May 21, 2019, all of which are hereby incorporated by reference for all purposes as if fully set forth herein.

BACKGROUND

Field

Exemplary embodiments relate to a touch display device, a data driver circuit, and a method of driving a controller.

Description of Related Art

With the development of information society, there has been increasing demand for a variety of image display devices. In this regard, a range of display devices, such as liquid crystal display (LCD) devices and organic light-emitting diode (OLED) display devices, have recently come into widespread use.

Such display devices provide a function of detecting a user's touch on a display panel using a finger or a pen and performing input processing based on the detected touch in order to provide a greater variety of functions.

For example, a touch sensing display device may include a plurality of touch electrodes disposed on or within a display panel, and can detect a user's touch and touch coordinates on the display panel by driving the touch electrodes.

Since such a touch sensing display device provides both an image display function and a touch sensing function using the display panel, the touch sensing may affect the display driving or the performance of the touch sensing may be degraded by the display driving, which is problematic.

SUMMARY

Various aspects of the present disclosure provide a touch display device able to perform touch sensing irrespective of a period of time for which display driving is performed.

Also provided is a touch display device able to improve the performance of the touch sensing by removing noise, which may be generated by the display driving, from touch sensing signals. In addition, provided is a display device able to prevent deteriorations due to the display driving for reducing noise in touch sensing signals.

Also provided are a data driver circuit, a controller, and a method of driving the controller, able to perform display driving in which an effect to the touch sensing can be minimized.

According to an aspect of the present disclosure, a touch display device may include a touch display panel on or within which a plurality of touch electrodes are disposed, a plurality of data lines disposed in the touch display panel, and a data driver circuit supplying a data voltage to the plurality of data lines.

The data voltage, supplied to N number of data lines of 2N number of adjacent data lines among the plurality of data lines by the data driver circuit, may be higher than a voltage applied to the touch electrodes, and the data voltage, supplied to remaining data lines of the 2N number of adjacent data lines among the plurality of data lines by the data driver circuit, is lower than the voltage applied to the touch electrodes. A difference between a total of values of the Kth data voltage supplied to the 2N number of adjacent data lines, and a total of values of the (K+1)th data voltage supplied to the 2N number of adjacent data lines, may be within a predetermined range from a preset value.

According to another aspect, a data driver circuit may include: an input buffer to which a data voltage corresponding to a data signal received from an external source is input, an output buffer outputting the data voltage to data lines, and a switch controlling a connection between the input buffer and the output buffer. A difference between a total of values of the Kth data voltage output Kth to 2N number of adjacent data lines, and a total of values of the (K+1)th data voltage output to the 2N number of adjacent data lines, may be within a predetermined range from a preset value.

According to another aspect, a method of driving a controller may include receiving image data from an external source, determining an inversion pattern of a Kth data voltage depending on the image data, calculating a difference between a total of values of a (K+1)th data voltage and a total of values of the Kth data voltage, using inversion pattern candidates of the (K+1)th data voltage and the inversion pattern of the Kth data voltage, determining an inversion pattern of the (K+1)th data voltage based on the difference, and outputting input data, including a data signal corresponding to the image data and an inversion control signal corresponding to the inversion pattern.

According to exemplary embodiments, a signal modulated on the basis of a touch driving signal applied to the touch electrodes may be supplied as a display driving signal, so that the display driving and the touch sensing can be simultaneously performed.

According to exemplary embodiments, it is possible to minimize noise in the touch sensing signal due to the display driving by varying the inversion pattern of the data voltage for the display driving using the transition value of the data voltage or the like. In addition, the overall inversion patterns of the data voltage can be changed in consecutive frames, so as to prevent deteriorations due to the display driving intended to minimize noise in the touch sensing signal.

According to exemplary embodiments, the controller can output the inversion control signal according to the image data, and the data driver circuit can adjust the inversion pattern with respect to subpixels in response to the inversion control signal, so that the display driving able to minimize noise in the touch sensing can be performed.

DESCRIPTION OF DRAWINGS

The above and other objects, features, and advantages of the present disclosure will be more clearly understood from the following detailed description, taken in conjunction with the accompanying drawings, in which:

FIG. 8 illustrates examples of the data voltage before an inversion pattern is varied, as well as transition values of the data voltage, in the touch display device according to embodiments.

FIG. 9 illustrates examples of selectable inversion patterns in the touch display device according to embodiments, in a case in which the inversion pattern is varied with respect to four subpixels.

FIGS. 10 and 11 illustrate examples of varying the inversion pattern with respect to four subpixels in the touch display device according to embodiments.

FIGS. 12 and 13 illustrate other examples of varying the inversion pattern with respect to four subpixels in the touch display device according to embodiments.

DETAILED DESCRIPTION

Figure 1:
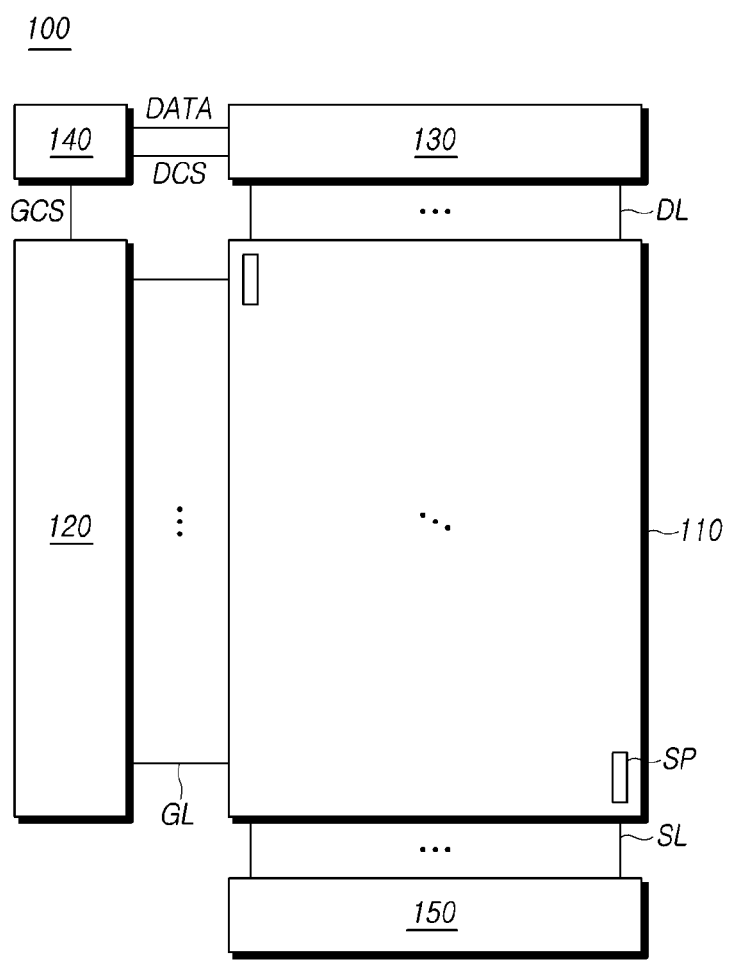
FIG. 1 illustrates a schematic configuration of a touch display device according to embodiments.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated into the present disclosure will be omitted in the case that the subject matter of the present disclosure may be rendered unclear thereby.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected," "coupled," or "linked" to another element, not only can it be "directly connected, coupled, or linked" to the other element, but it can also be "indirectly connected, coupled, or linked" to the other element via an "intervening" element.

FIG. 1 illustrates a schematic configuration of a touch display device 100 according to embodiments.

Referring to FIG. 1 the touch display device 100 according to embodiments may include a touch display panel 110, a gate driver circuit 120, a data driver circuit 130, and a controller 140. In addition, the display device 100 may include a touch driver circuit 150 to detect a touch on the touch display panel 110.

A plurality of gate lines GL and a plurality of data lines DL are disposed in the touch display panel 110, and a plurality of subpixels SP are disposed in areas in which the gate lines GL intersect the data lines DL.

In addition, a plurality of touch electrodes TE may be disposed on or within the touch display panel 110, and a plurality of sensing lines SL electrically connecting the touch electrodes TE and the touch driver circuit 150 may be disposed in the touch display panel 110.

Describing a configuration for display driving in the touch display device 100 first, the gate driver circuit 120 controls the driving timing of the subpixels SP disposed in the touch display panel 110. In addition, the data driver circuit 130 supplies a data voltage Vdata, corresponding to image data, to the subpixels SP, so that the subpixels SP displaying an image by illuminating luminous intensities corresponding to grayscale levels of the image data.

Specifically, the gate driver circuit 120 is controlled by the controller 140, and controls the driving timing of the plurality of subpixels SP by sequentially outputting a scan signal to the plurality of gate lines GL disposed in the display panel 110.

The gate driver circuit 120 may include one or more gate driver integrated circuits (GDIC), which may be disposed on one or both sides of the display panel 110, depending on the driving system. Alternatively, the gate driver circuit 120 may be implemented using a gate-in-panel (GIP) structure embedded in a bezel area of the display panel 110.

The data driver circuit 130 receives image data (or input data) from the controller 140, and converts the received image data into an analog data voltage Vdata. In addition, the data driver circuit 130 outputs the data voltage Vdata to the respective data lines DL at points in time at which the scan signal is applied through the gate lines GL, so that the respective subpixels SP express luminous intensities according to the image data. The data voltage Vdata may include a plurality of voltages that are supplied to the data lines DL.

The data driver circuit 130 may include one or more source driver integrated circuits (SDICs).

The controller 140 supplies a variety of control signals to the gate driver circuit 120 and the data driver circuit 130, and controls the operations of the gate driver circuit 120 and the data driver circuit 130.

The controller 140 controls the gate driver circuit 120 to output the scan signal at points in time realized by respective frames, converts data input from an external source into image data having a data signal format readable by the data driver circuit 130, and outputs the converted image data to the data driver circuit 130.

The controller 140 receives a variety of timing signals, including a vertical synchronization signal VSYNC, a horizontal synchronization signal HSYNC, an input data enable (DE) signal, a clock (CLK) signal, and the like, from an external source (e.g. a host system).

The controller 140 may generate a variety of control signals using the variety of timing signals received from the external source, and output the variety of control signals to the gate driver circuit 120 and the data driver circuit 130.

For example, the controller 140 outputs a variety of gate control signals GCS, including a gate start pulse (GSP) signal, a gate shift clock (GSC) signal, a gate output enable (GOE) signal, and the like, to control the gate driver circuit 120.

Here, the gate start pulse signal is used to control the operation start timing of one or more gate driver ICs of the gate driver circuit 120. The gate shift clock (GSC) signal is a clock signal commonly input to the one or more gate driver ICs to control the shift timing of the scan signal. The gate output enable (GOE) signal designates timing information of the one or more gate driver ICs.

In addition, the controller 140 outputs a variety of data control signals DCS, including a source start pulse (SSP) signal, a source sampling clock (SSC) signal, a source output enable (SOE) signal, and the like, to control the data driver circuit 130.

Here, the source start pulse (SSP) signal is used to control the data sampling start timing of one or more source driver ICs of the data driver circuit 130. The source sampling clock (SSC) signal is a clock signal controlling the sampling timing of data in each of the source driver ICs. The source output enable (SOE) signal controls the output timing of the data driver circuit 130.

The touch display device 100 may further include a power management IC (PMIC) supplying various forms of voltage or current to the display panel 110, the gate driver circuit 120, the data driver circuit 130, and the like, or controls various forms of voltage or current to be supplied to the same.

The subpixels SP are defined by the intersections of the gate lines GL and the data lines DL. Liquid crystal cells or light-emitting elements may be disposed in the subpixels SP, depending on the type of the touch display device 100.

For example, in a case in which the touch display device 100 is a liquid crystal display (LCD) device, the LCD touch display device 100 includes a light source device, such as a backlight unit, to illuminate the touch display panel 110, and liquid crystals are disposed in the subpixels SP of the touch display panel 110. In addition, the LCD touch display device 100 can express luminous intensities and display an image depending on image data by adjusting the alignment of the liquid crystals using electromagnetic fields generated in response to the data voltage Vdata applied to the subpixels SP.

In addition, the touch display device 100 according to embodiments can detect a user's touch on the touch display panel 110 using the touch electrodes TE, included in the touch display panel 110, and the touch driver circuit 150.

Figure 2:
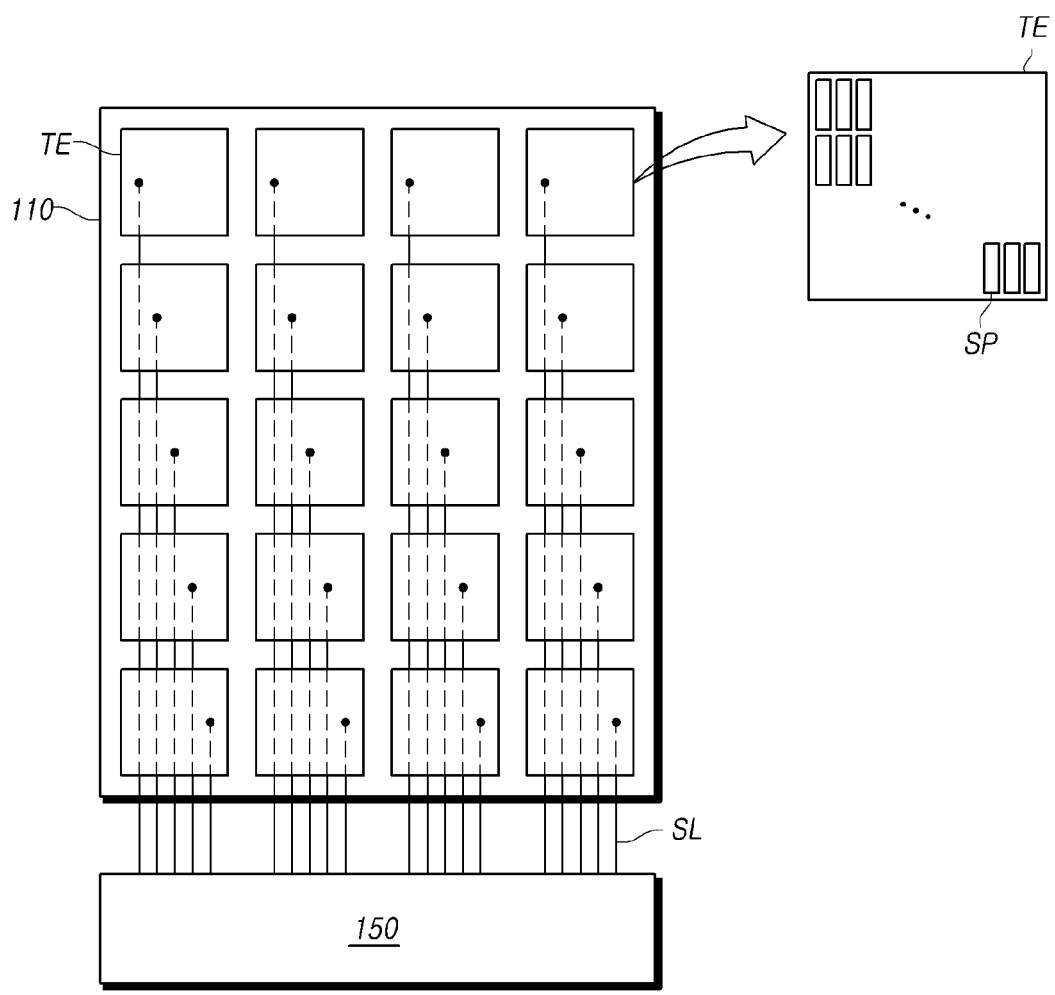
FIG. 2 illustrates a structure of the touch electrodes disposed in the touch display panel and the touch driver circuit driving the touch electrodes to detect a touch, in the touch display device according to embodiments.

FIG. 2 illustrates a structure of the touch electrodes TE disposed in the touch display panel 110 and the touch driver circuit 150 driving the touch electrodes TE to detect a touch, in the touch display device 100 according to embodiments.

Referring to FIG. 2, the plurality of touch electrodes TE and the plurality of sensing lines SL connecting the touch electrodes TE to the touch driver circuit 150 may be disposed in the touch display panel 110.

The touch electrodes TE may be disposed on or within the touch display panel 110. In addition, the touch electrodes TE may be electrodes used for display driving or electrodes separately disposed for touch sensing. In addition, the touch electrodes TE may be configured as a transparent bulk electrode or an opaque mesh-shaped electrode.

For example, in a case in which the touch display device 100 is an LCD display device, the touch electrodes TE may be provided as a common electrode disposed within the touch display panel 110, with a common voltage Vcom being applied thereto in the display driving.

That is, the common electrode may have a structure comprised of sections divided across the touch display panel 110 to be used as the touch electrodes TE for the touch sensing. Thus, the touch electrodes TE may be disposed to overlap with the plurality of subpixels SP.

The touch electrodes TE are connected to the touch driver circuit 150 through the sensing lines SL disposed in the touch display panel 110.

The touch driver circuit 150 may include a touch sensing circuit connected to the touch electrodes TE through the sensing lines SL and a touch controller controlling the touch sensing circuit and detecting a touch. In addition, the touch driver circuit 150 may include a touch power circuit supplying a touch driving signal TDS to the touch sensing circuit, under the control of the touch controller.

At least a portion of the touch driver circuit 150 may be integrated with the data driver circuit 130.

The touch sensing circuit outputs the touch driving signal TDS to the plurality of the touch electrodes TE, and receives a touch sensing signal TSS from the plurality of touch electrodes TE. The touch sensing circuit may perform the touch sensing in a period different than a display driving period due to time division or simultaneously with the display driving in the display driving period.

The touch sensing circuit may be connected to the touch electrodes TE in a one-to-one relationship to receive the touch sensing signal TSS. That is, the touch sensing circuit may output the touch driving signal TDS to the touch electrodes TE through the sensing lines SL, receive the touch sensing signal TSS, and sense a change in self-capacitance caused by a touch.

Alternatively, the touch electrodes TE may be divided into driving electrodes and sensing electrodes disposed in the touch display panel 110, and the touch sensing circuit may be connected to the driving electrodes and the sensing electrodes. In this case, the touch sensing circuit may output the touch driving signal TDS to the driving electrodes, receive the touch sensing signal TSS from the sensing electrodes, and detect a change in the mutual capacitance between driving electrodes and the sensing electrodes caused by the touch.

The touch sensing circuit converts the received touch sensing signal TSS into digital sensing data, and transfers the converted sensing data to the touch controller.

The touch controller may control the operation of the touch sensing circuit, receive sensing data from the touch sensing circuit, and detect the user's touch on the touch display panel 110, on the basis of the received sensing data.

That is, the touch controller may detect a change in the self-capacitance or the mutual capacitance from the sensing data, and determine a touch, touch coordinates, or the like, on the basis of the detected change in the capacitance.

The touch sensing, performed by the touch driver circuit 150, may be performed in a period different than the display driving due to time division or simultaneously with the display driving.

Figure 3:
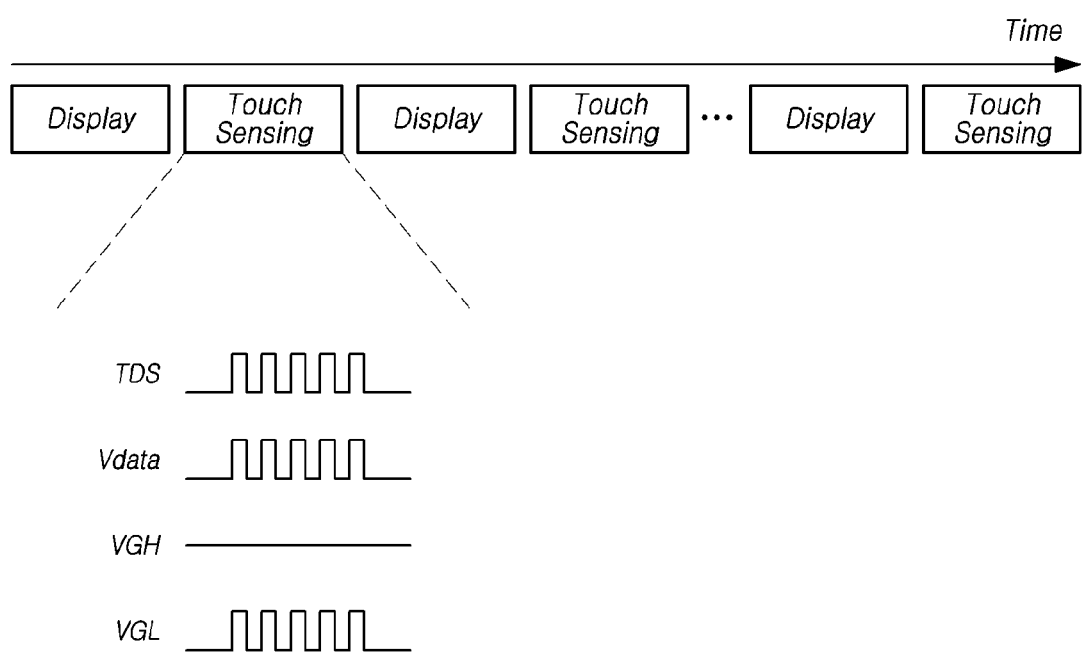
FIG. 3 illustrates example timings of the display driving and the touch sensing of the touch display device according to embodiments, in a case in which the display driving and the touch sensing are performed in different periods of time.

FIG. 3 illustrates example timings of the display driving and the touch sensing of the touch display device 100 according to embodiments, in a case in which the display driving and the touch sensing are performed in different periods of time.

Referring to FIG. 3, the touch display device 100 according to embodiments can perform the touch sensing by driving the touch electrodes TE of the touch display panel 110 in periods between display driving periods (e.g. blank periods).

For example, the touch display device 100 may perform the touch sensing in vertical blank periods respectively present in a single image frame. Alternatively, the touch sensing may be performed in some of a plurality of horizontal blank periods present in a single image frame.

In a case in which the common electrode of the touch display panel 110 is used as the touch electrodes TE, a common voltage Vcom may be applied to the touch electrodes TE in display driving periods, while a touch driving signal TDS may be applied to the touch electrodes TE in touch sensing periods.

The touch driving signal TDS may be a pulse voltage signal, the magnitude of which changes over time.

Since the display driving is not performed in the touch sensing periods, components for the display driving, such as the electrodes and the signal lines, may have no voltage applied thereto or be in a constant voltage state. Thus, capacitance may be generated between the touch electrodes TE, to which the touch driving signal TDS is applied, and the other lines, such as the gate lines GL and the data lines DL. Due to such capacitance, the ability to detect the touch sensing signal TSS may be degraded.

To prevent capacitance between the touch electrodes TE and the other lines, such as the gate lines GL and the data lines DL, a signal having the same voltage and phase as those of the touch driving signal TDS, applied to the touch electrodes TE, may be supplied to the gate lines GL, the data lines DL, and the like, during the touch sensing periods.

That is, as illustrated in FIG. 3, a data voltage Vdata, the voltage and phase of which are the same as those of the touch driving signal TDS, may be supplied to the data lines DL. In addition, since the gate lines GL have a gate low voltage VGL applied thereto during the touch sensing periods, a signal, the voltage and phase of which are the same as those of the touch driving signal TDS, may be output to the gate lines GL.

As described above, the signal having the same voltage and phase as those of the touch driving signal TDS, applied to the touch electrodes TE, can be supplied to the gate lines GL, the data lines DL, and the like, during the touch sensing periods, to prevent capacitance between the touch electrodes TE and the signal lines, so that the ability to detect the touch sensing signal TSS can be improved.

Alternatively, the touch display device 100 according to embodiments can simultaneously perform the display driving and the touch sensing.

Figure 4:
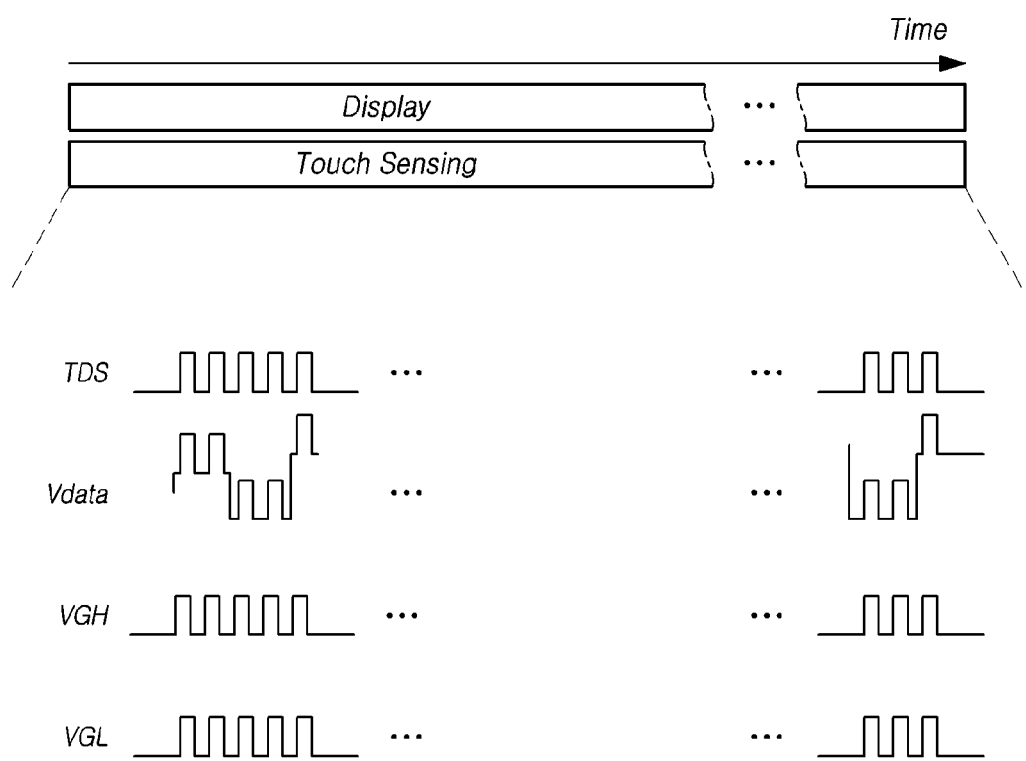
FIG. 4 illustrates example timings of the display driving and the touch sensing of the touch display device according to embodiments, in a case in which the display driving and the touch sensing are simultaneously performed.

FIG. 4 illustrates example timings of the display driving and the touch sensing of the touch display device 100 according to embodiments, in a case in which the display driving and the touch sensing are simultaneously performed.

Referring to FIG. 4, the touch display device 100 according to embodiments can simultaneously perform the display driving and the touch sensing.

Here, the touch sensing periods may be the same as the display driving periods, or may be blank periods between the display driving periods. That is, the touch sensing may be independently performed, irrespective of the display driving, so that the touch sensing and the display driving may be simultaneously performed.

In a case in which the touch sensing is performed simultaneously with the display driving, the touch driving signal TDS is applied to the touch electrodes TE. In addition, the data voltage Vdata may be supplied to the data lines DL for the display driving, and a gate high voltage VGH, a gate low voltage VGL, and the like, used for the output of the scan signal applied to the gate lines GL, may be output.

Here, in a case in which the common electrode of the touch display panel 110 is used as the touch electrodes TE, the touch driving signal TDS is applied to the touch electrodes TE, so that a voltage difference corresponding to image data may not be generated between the common electrode and the pixel electrodes to which the data voltage Vdata is applied.

That is, since the voltage of the touch driving signal TDS changes over time, a voltage difference corresponding to the image data may not be formed between the common electrode to which the touch driving signal TDS is applied and the pixel electrodes, so that the subpixels SP cannot express luminous intensities corresponding to the image data.

Accordingly, the data voltage Vdata, modulated on the basis of the touch driving signal TDS, is supplied to the data lines DL, so that the voltage difference corresponding to the image data may be formed between the common electrode to which the touch driving signal TDS is applied and the pixel electrodes.

The modulation of the data voltage Vdata may be performed by modulating, for example, a gamma voltage used for generating the data voltage Vdata in the data driver circuit 130. Alternatively, it is possible to supply the modulated data voltage Vdata to the data lines DL by modulating the ground voltage disposed in the touch display panel 110.

In addition, the gate high voltage VGH and the gate low voltage VGL, used for generating the scan signal supplied to the gate lines GL, may be modulated on the basis of the touch driving signal TDS, so that the modulated scan signal can be applied to the gate lines GL so that the gate lines GL can be driven ordinarily.

As described above, it is possible to modulate the gate high voltage VGH and the gate low voltage VGL, used for generating the scan signal supplied to the gate lines GL, and a gamma voltage, used for generating the data voltage Vdata applied to the data lines DL, on the basis of the touch driving signal TDS, so that the display driving and the touch sensing can be simultaneously performed.

Figure 5:
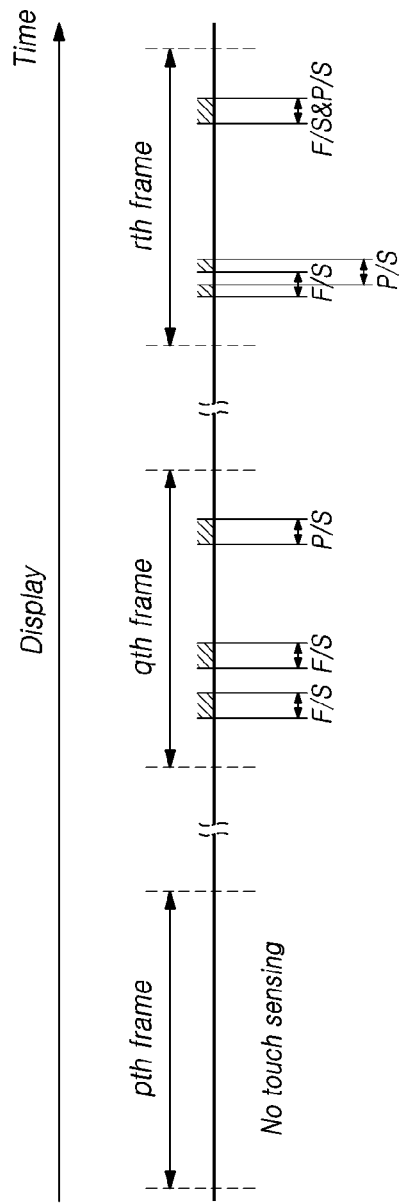
FIG. 5 illustrates various examples of performing finger sensing or pen sensing according to the timings of the display driving and the touch sensing displayed in FIG. 4.

FIG. 5 illustrates various examples of performing finger sensing or pen sensing according to the timings of the display driving and the touch sensing displayed in FIG. 4.

Referring to FIG. 5, the touch display device 100 according to embodiments may perform the display driving alone or simultaneously perform the display driving and the touch sensing. In addition, the touch sensing may only be performed in some of the display driving periods, or finger sensing F/S and pen sensing P/S may be performed in different periods or the same period.

For example, the touch display device 100 may only perform the display driving without performing the touch sensing, such as the finger sensing F/S or the pen sensing P/S, during a one-frame period, as in the pth frame.

In addition, the touch display device 100 may perform the touch sensing, such as the finger sensing F/S or the pen sensing P/S, during some of the display driving periods, in which the touch sensing is necessary, as in the qth frame.

Here, the finger sensing F/S and the pen sensing P/S may be performed in different periods that do not overlap with each other.

In addition, the touch display device 100 may perform the touch sensing in the display driving period, as in the rth frame, and may perform the finger sensing F/S and the pen sensing P/S in an overlapping period. In this case, the result of each of the finger sensing F/S and the pen sensing P/S may be categorized by an algorithm determined by the touch controller or signal analysis depending on the sensing position.

Not only the above examples, but also the display driving and the touch sensing (e.g. finger sensing and pen sensing), may be independently performed in various timings.

In a case in which the touch display device 100 is an LCD display device, the display driving may be performed in an inversion manner in which the data voltage Vdata is reversed on the basis of the common voltage Vcom in order to improve image quality. Such inversion driving may be performed in a variety of schemes, for example, with respect to frames, columns, or subpixels SP.

In a case in which the display driving is performed in the inversion manner, the data voltage Vdata may be reversed, and the data lines DL may experience significant voltage fluctuations. Accordingly, the use of the common electrode as the touch electrodes TE may have an effect on the touch sensing performed simultaneously with the display driving in the display driving period.

Figure 6:
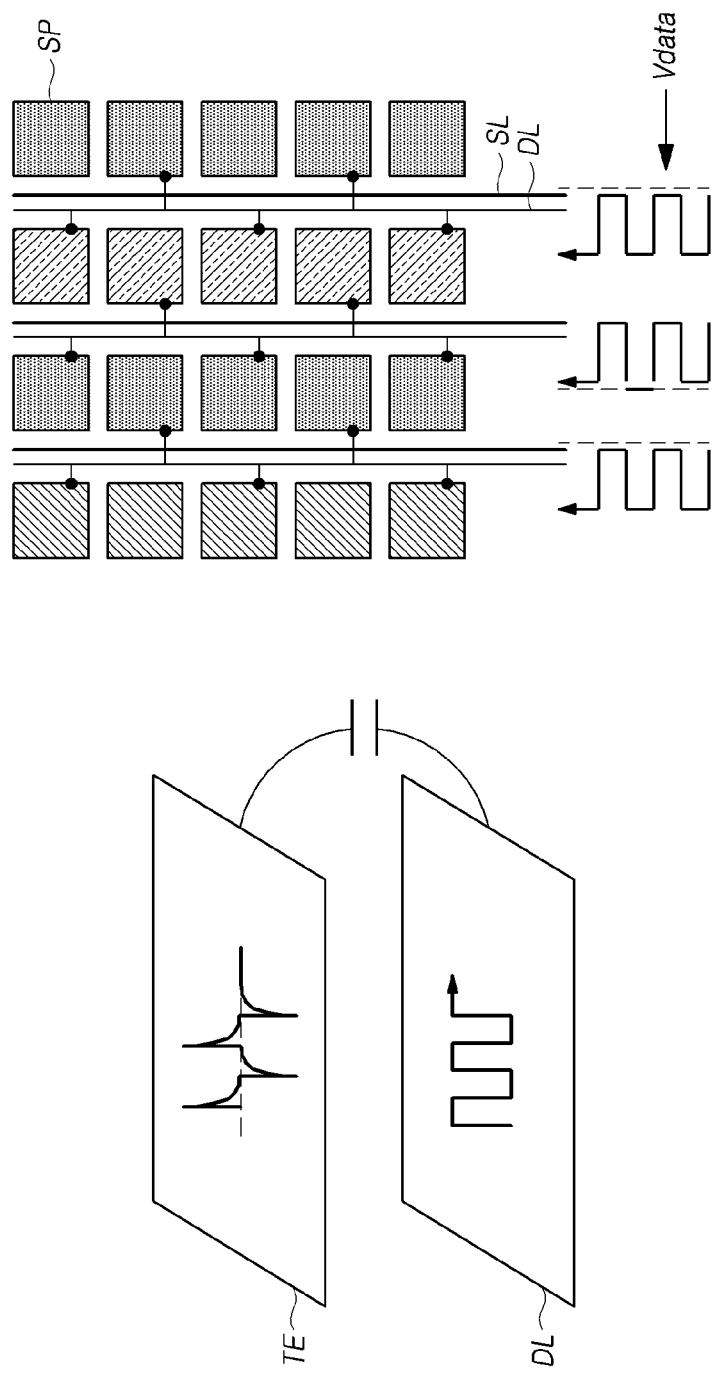
FIG. 6 illustrates an example of noise that may occur in a touch sensing signal, due to display driving in the touch display device according to embodiments, in a case in which a constant voltage is applied to the touch electrodes.

FIG. 6 illustrates an example of noise that may occur in a touch sensing signal TSS, due to display driving in the touch display device 100 according to embodiments, in a case in which a constant voltage is applied to the touch electrodes TE.

Referring to FIG. 6, an example structure of performing the inversion with respect to columns is illustrated. In the structure illustrated in FIG. 6, data lines DL are connected to subpixels SP, disposed on both sides thereof, in an alternating manner.

Since the inversion is performed with respect to columns, the data voltage Vdata having the same polarity with respect to the common voltage is supplied to subpixels SP in the first and third columns, among the plurality of subpixels SP. In addition, the data voltage Vdata, supplied to subpixels SP disposed in the second and fourth columns, may have a different polarity from that of the data voltage Vdata supplied to the subpixels SP in the first and third columns.

Since the data lines DL are disposed to be alternately connected with the subpixels SP, disposed on both sides thereof, the polarity of the data voltage Vdata, supplied to every data line DL, may be reversed in every subpixel SP, with respect to the common voltage.

In addition, since capacitance is generated between the data lines DL and the common electrode serving as the touch electrodes TE, the touch driving signal TDS applied to the touch electrodes TE may fluctuate, due to the reversing of the data voltage Vdata applied to the data lines DL.

Accordingly, the touch sensing signal TSS detected using the touch electrodes TE may have noise, such that the performance of the touch sensing may be degraded.

The touch display device 100 according to embodiments provides a solution able to modify the inversion method to minimize fluctuations in the touch driving signal TDS applied to the touch electrodes TE, thereby improving the performance of the touch sensing.

Figure 7:
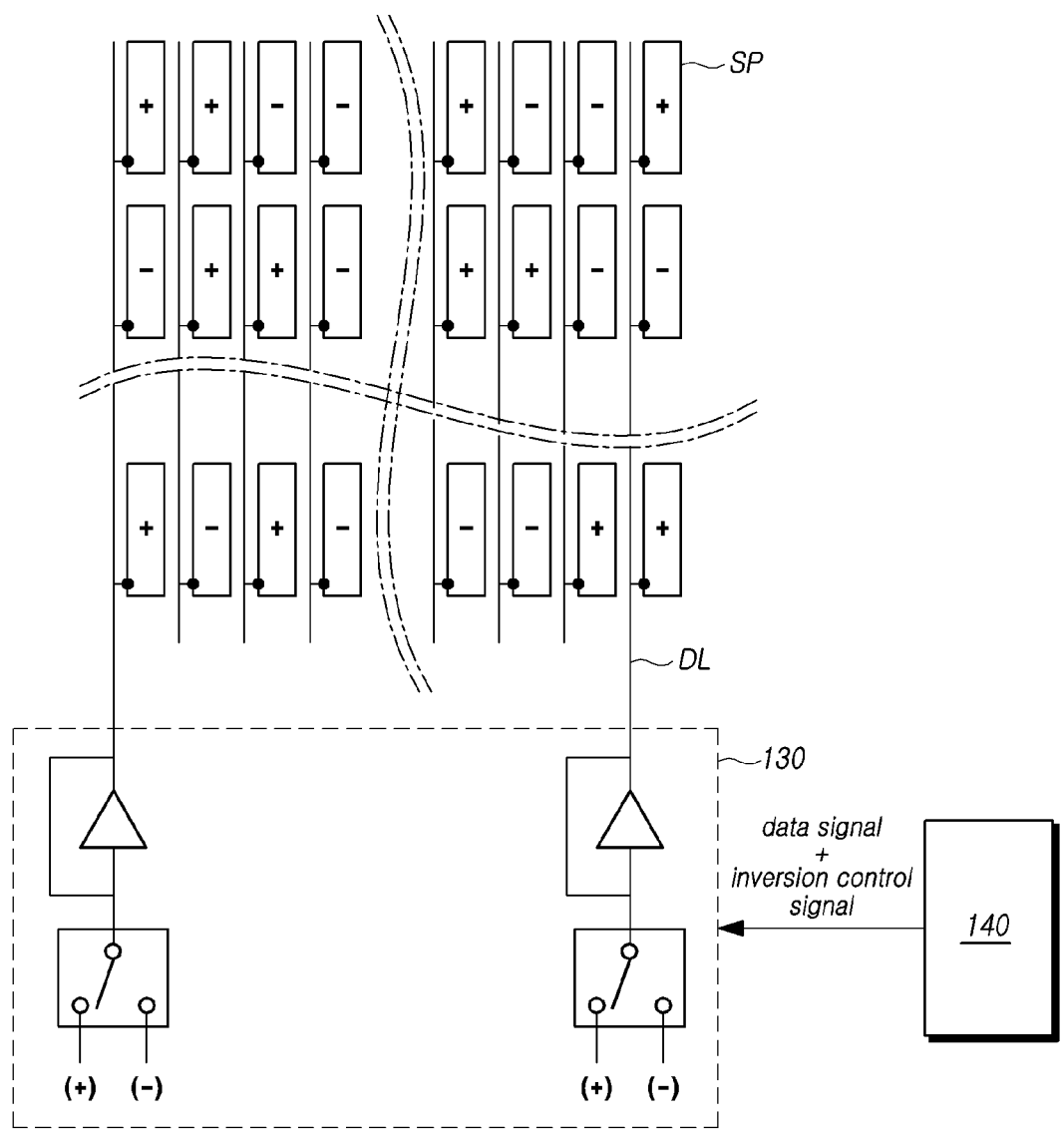
FIG. 7 illustrates a concept of varying the inversion pattern of the data voltage in the touch display device according to embodiments.

FIG. 7 illustrates a concept of varying the inversion pattern of the data voltage Vdata in the touch display device 100 according to embodiments.

Referring to FIG. 7, the touch display device 100 according to embodiments may perform the touch sensing during the display driving period.

In addition, the data voltage Vdata supplied to the data lines DL for the display driving may be supplied in an inversion manner.

Here, the data driver circuit 130 may vary the inversion pattern of the data voltage Vdata, supplied to a predetermined number of adjacent subpixels SP, in consideration of the transition value of the data voltage Vdata.

Such variation in the inversion pattern may be performed with respect to 2N number of adjacent subpixels SP. The data voltage Vdata having a positive (+) polarity with respect to the common voltage Vcom may be applied to N number of subpixels SP among the 2N number of adjacent subpixels SP, while the data voltage Vdata having a negative (−) polarity with respect to the common voltage Vcom may be applied to the remaining N number of subpixels SP.

For example, the inversion pattern may be varied with respect to four adjacent subpixels SP, in which the data voltage Vdata having a positive (+) polarity may be applied to two subpixels SP among four adjacent subpixels SP, while the data voltage Vdata having a negative (−) polarity may be applied to the remaining two subpixels SP.

In addition, the inversion pattern may be varied with respect to even number of subpixels SP, such as 6 or 8 subpixels SP, in which subpixels SP to which the data voltage Vdata having a positive (+) polarity is applied may be determined to be the same number as subpixels SP to which the data voltage Vdata having a negative (−) polarity is applied. Accordingly, the degradation of image quality due to the non-uniform polarities can be prevented.

The data driver circuit 130 can vary the inversion pattern of the data voltage Vdata, supplied to the 2N number of adjacent subpixels SP, i.e. 2N number of adjacent data lines DL, with respect to rows of the subpixel SP.

Thus, the inversion pattern of the Kth data voltage Vdata supplied to the 2N number of adjacent data lines DL by the data driver circuit 130, may be the same as or different from the inversion pattern of the data voltage Vdata supplied (K+1)th. In other words, an inversion pattern of the data voltage Vdata that is applied to the 2N adjacent data lines DL when the 2N adjacent data lines are driven a Kth time (for example, when a Kth row of subpixels is driven) may be the same as or different from an inversion pattern of the data voltage Vdata that is applied to the 2N adjacent data lines DL when the 2N adjacent data lines are driven a (K+1)th time (for example, when a (K+1)th row of subpixels is driven), wherein K is a natural number.

In addition, changes in the inversion pattern may be performed on the basis of an inversion control signal received from the controller 140.

The controller 140 may transmit a data signal, converted from image data received from an external source, to the data driver circuit 130. The controller 140 may transmit the inversion control signal together with the data signal.

The inversion control signal may be a signal instructing an inversion pattern of the corresponding data signal. The controller 140 may transmit the inversion control signal by selecting one inversion pattern from among selectable candidates of inversion patterns.

For example, in a case in which the inversion pattern is varied with respect to four subpixels SP, the number of the selectable inversion patterns may be $_4C_2=6$.

The controller 140 may select the inversion pattern to be applied to the corresponding data signal from among the six inversion patterns, in consideration of the transition value depending on the polarity of the data voltage Vdata.

Here, the controller 140 may determine the inversion pattern of the (K+1)th data voltage Vdata supplied such that a difference between a total value of the Kth data voltage Vdata supplied to 2N number of adjacent subpixels SP and a total value of the (K+1)th data voltage Vdata supplied to 2N number of adjacent subpixels SP is a predetermined value or within a predetermined range from the predetermined value. Here, the predetermined value may be "0."

That is, the inversion pattern can be varied so that the transition value of the Kth data voltage Vdata supplied and the (K+1)th data voltage Vdata supplied is 0 or a value close to 0, thereby preventing fluctuations in the touch driving signal TDS applied to the touch electrodes TE due to the polarity inversion of the data voltage Vdata.

Alternatively, the controller 140 may determine the inversion pattern of the data voltage Vdata so that the average of the data voltage Vdata, supplied to 2N number of adjacent subpixels SP, is a specific voltage or within a range from the specific voltage. Here, the specific voltage may be a voltage applied to the common electrode, i.e. the touch electrodes TE.

As described above, the average of the data voltage Vdata supplied to the 2N number of adjacent subpixels SP can be set to be a specific value, so that the transition value of the data voltage Vdata is 0.

In addition, the average can be maintained to be the same as the voltage applied to the touch electrodes TE in order to minimize variations in the touch driving signal TDS applied to the touch electrodes TE.

Accordingly, it is possible to prevent fluctuations in the voltage of the touch electrodes TE due to the polarity inversion of the data voltage Vdata by varying the inversion pattern in consideration of the data voltage Vdata supplied to the 2N number of adjacent subpixels SP. In addition, it is possible to improve the performance of the touch sensing performed simultaneously in the display driving period by minimizing fluctuations in the voltage of the touch electrodes TE.

Hereinafter, the above-described method of varying the inversion pattern of the data voltage Vdata will be described with respect to examples.

FIG. 8 illustrates examples of the data voltage Vdata before an inversion pattern is varied, as well as transition values of the data voltage Vdata, in the touch display device 100 according to embodiments.

Referring to FIG. 8, a case, in which the pattern is inverted with respect to columns and a common voltage Vcom is 5.5V, is illustrated by way of example.

In addition, a case, in which the data voltage Vdata of a highest grayscale having a positive (+) polarity is 11V and the data voltage Vdata of a lowest grayscale having the positive (+) polarity is 6V, is illustrated. In addition, a case, in which the data voltage Vdata of a negative (−) polarity having a highest grayscale is 0V and the data voltage Vdata of the negative (−) polarity is 5V having a lowest grayscale, is illustrated.

Here, in a case in which the inversion is performed with respect to columns, all of transition values between the data voltage Vdata, supplied to subpixels SP in the first row, and the data voltage Vdata, supplied to subpixels SP in the second row, may be 5. In addition, all of transition values between the data voltage Vdata, supplied to subpixels SP in the second row, and the data voltage Vdata, supplied to subpixels SP in the third row, may be −5.

When the transition values of the data voltage Vdata are summed, a total of the transition values between the data voltage Vdata, supplied to the subpixels SP in the first row, and the data voltage Vdata, supplied to the subpixels SP in the second row, is 30. In addition, a total of the transition values between the data voltage Vdata, supplied to the subpixels SP in the second row, and the data voltage Vdata, supplied to the subpixels SP in the third row, is −30.

Thus, due to a significant variation between the Kth data voltage Vdata supplied to adjacent subpixels SP, and the data voltage Vdata, supplied (K+1)th to adjacent subpixels SP, the touch driving signal TDS may have a significant fluctuation. In addition, fluctuations in the touch driving signal TDS applied to the touch electrodes TE may affect the touch sensing.

According to embodiments, the inversion pattern of the data voltage Vdata may be varied to reduce the transition value of the data voltage Vdata, and in a case in which the inversion pattern is varied with respect to four adjacent subpixels SP, selectable inversion patterns may be six, as illustrated in FIG. 9.

That is, the data voltage Vdata having a positive (+) polarity may be supplied to two subpixels SP among the four adjacent subpixels SP, while the data voltage Vdata having a negative (−) polarity may be supplied to the remaining two subpixels SP among the four adjacent subpixels SP. In addition, the subpixels SP to which the data voltage Vdata having the positive (+) or negative (−) polarity is supplied may be changed with respect to columns.

FIGS. 10 and 11 illustrate examples of varying the inversion pattern with respect to four subpixels SP in the touch display device 100 according to embodiments.

Referring to FIG. 10, an example case of varying the inversion pattern such that a difference between a total of values of the data voltage Vdata, supplied to subpixels SP in the Kth row, and a total of values of the data voltage Vdata, supplied to subpixels SP in the (K+1)th row, is a specific value, e.g. 0, is illustrated. Here, a case, in which the common voltage Vcom applied to the touch electrodes TE, i.e. the common electrode, is 5.5V, is illustrated. In addition, a case, in which the data voltage Vdata of a highest grayscale having a positive (+) polarity is 11V and the data voltage Vdata of a lowest grayscale having the positive (+) polarity is 6V, is illustrated. In addition, a case, in which the data voltage Vdata of a highest grayscale having a negative (−) polarity is 0V and the data voltage Vdata of a lowest grayscale having the negative (−) polarity is 5V, is illustrated. Accordingly, the data voltage Vdata in the range from 6V to 11V indicates the data voltage Vdata having the positive (+) polarity, while the data voltage Vdata in the range from 0V to 5V indicates the data voltage Vdata having the negative (−) polarity.

Image data represented by four subpixels SP in the first row may be comprised of the highest grayscale, the lowest grayscale, the highest grayscale, and the lowest grayscale. In a case in which the inversion pattern of the data voltage Vdata, supplied to the subpixels SP in the first row, is comprised of +, −, +, and − polarities, the data voltage Vdata may be 11V, 5V, 11V, and 5V. In addition, the data voltage Vdata supplied to subpixels SP in the second row is determined depending on transition values between the data voltage Vdata supplied to the subpixels SP in the first row and the data voltage Vdata supplied to the subpixels SP in the second row according to the inversion pattern.

Here, in a case in which the inversion pattern is determined with respect to four subpixels SP, the inversion pattern of the data voltage Vdata supplied to the subpixels SP in the second row may be selected from six inversion patterns. That is, CASE #1 indicates a situation in which the data voltage Vdata having +, +, −, and − polarities is supplied to the subpixels SP in the second row, while CASE #2 indicates a situation in which the data voltage Vdata having −, −, +, and + polarities is supplied to the subpixels SP in the second row. In the same manner, CASE #3 to #6 may indicate combinations of different polarities, respectively. In addition, in a case in which image data represented by the subpixels SP in the second row is comprised of the lowest grayscale, the highest grayscale, the lowest grayscale, and the highest grayscale, the data voltage Vdata according to the six inversion patterns may be calculated. For example, in the case of +, +, −, − polarities as in CASE #1, the data voltage Vdata may be 6V, 11V, 5V, and 0V. In addition, in the case of −, −, +, and + polarities as in CASE #2, the data voltage Vdata may be 5V, 0V, 6V, and 11V.

A difference between a total of values of the data voltage Vdata according to the six inversion patterns and a total of values of the data voltage Vdata supplied to the subpixels SP in the first row is calculated.

Here, in a situation in which the data voltage Vdata having −, +, −, and + polarities is supplied to the subpixels SP in the second row in CASE #4, it can be appreciated that the transition value of the data voltage Vdata, i.e. a total of the data voltage Vdata, supplied to the subpixels SP in the first row, and the data voltage Vdata, supplied to the subpixels SP in the second row, is zero (0).

Accordingly, the data voltage Vdata according to the inversion pattern of CASE #4 is supplied to the subpixels SP in the second row.

That is, the inversion pattern of the first row may be set to +, −, +, and − polarities and the inversion pattern of the second row may be set to −, +, −, and + polarities, so that the transition value between the data voltage Vdata in the first row and the data voltage Vdata in the second row is 0. In addition, due to the transition value of the data voltage Vdata being set to 0, fluctuations in the voltage of the touch electrodes TE due to the transition of the data voltage Vdata can be prevented.

In the same manner, the inversion pattern of the data voltage Vdata supplied to subpixels SP in the third row is determined, in consideration of the data voltage Vdata supplied to the subpixels SP in the second row.

In a case in which the data voltage Vdata supplied to the subpixels in the third row indicates the highest grayscale, the lowest grayscale, the highest grayscale, and the lowest grayscale, the transition value is calculated in consideration of the polarities of the data voltage Vdata, supplied to the subpixels SP in the second row, being −, +, −, and +. In the case of the data voltage Vdata supplied to the subpixels SP in the third row, it can be appreciated that, when the data voltage Vdata having +, −, +, and − polarities is supplied according to CASE #3, the transition value between the data voltage Vdata of the second row and the data voltage Vdata of the third row is 0.

Accordingly, the inversion pattern of the data voltage Vdata supplied to the subpixels SP in the third row is determined to be CASE #3.

The inversion patterns of the data voltage Vdata supplied to the remaining rows can be determined in the same manner. FIG. 11 illustrates examples of determined inversion patterns.

Referring to FIG. 11, the inversion pattern of the subpixels SP in the first row may be determined to be CASE #3, and in the same manner, the inversion patterns of subpixels SP in the second to sixth rows may be determined to be CASE #4, CASE #3, CASE #4, CASE #3, and CASE #4, respectively.

In addition, it can be appreciated that, when the data voltage Vdata is supplied according to the above-described inversion patterns, a total of the transition values of the data voltage Vdata supplied to four adjacent subpixels SP is 0.

Accordingly, the inversion driving in which the polarity of the data voltage Vdata is reversed can make it possible to prevent fluctuations in the voltage of the touch electrodes TE and improve the performance of the touch sensing.

In addition, although the common voltage Vcom has been described as being 5.5V in the above-described examples, the level of the common voltage Vcom may be set differently. For example, the common voltage Vcom may be 0V. In this case, the data voltage Vdata may range from 0.5V to 5.5V. In this case, the data voltage Vdata having the positive (+) polarity may range from 0.5V to 5.5V, while the data voltage Vdata having the negative (−) polarity may range from −0.5V to −5.5V.

In a case in which the common voltage Vcom is 0V, in the illustration of FIG. 10, the data voltage Vdata supplied to the subpixels SP in the first row may be 5.5V, −0.5V, 5.5V, and −0.5V. In addition, the data voltage Vdata supplied to the subpixels SP in the second row may be 0.5V, 5.5V, −0.5V, and −5.5V (CASE #1); −0.5V, −5.5V, 0.5V, and 5.5V (CASE #2); 0.5V, −5.5V, 0.5V, and −5.5V (CASE #3); −0.5V, 5.5V, −0.5V, and 5.5V (CASE #4); 0.5V, −5.5V, −0.5V, and 5.5V (CASE #5); −0.5V, 5.5V, 0.5V, and −5.5V (CASE #6), according to the inversion patterns. In this case, the transition value, i.e. the difference between the data voltage Vdata supplied to the subpixels SP in the first row and the data voltage Vdata supplied to the subpixels SP in the second row, may be calculated in the same manner as illustrated in FIG. 10. Accordingly, the inversion pattern of the data voltage Vdata supplied to the subpixels SP in the second row may be determined to be CASE #4 in which the transition value is determined to be 0.

This inversion pattern may be determined on the basis of the average of values of the data voltage Vdata supplied to adjacent subpixels SP.

Figure 13:
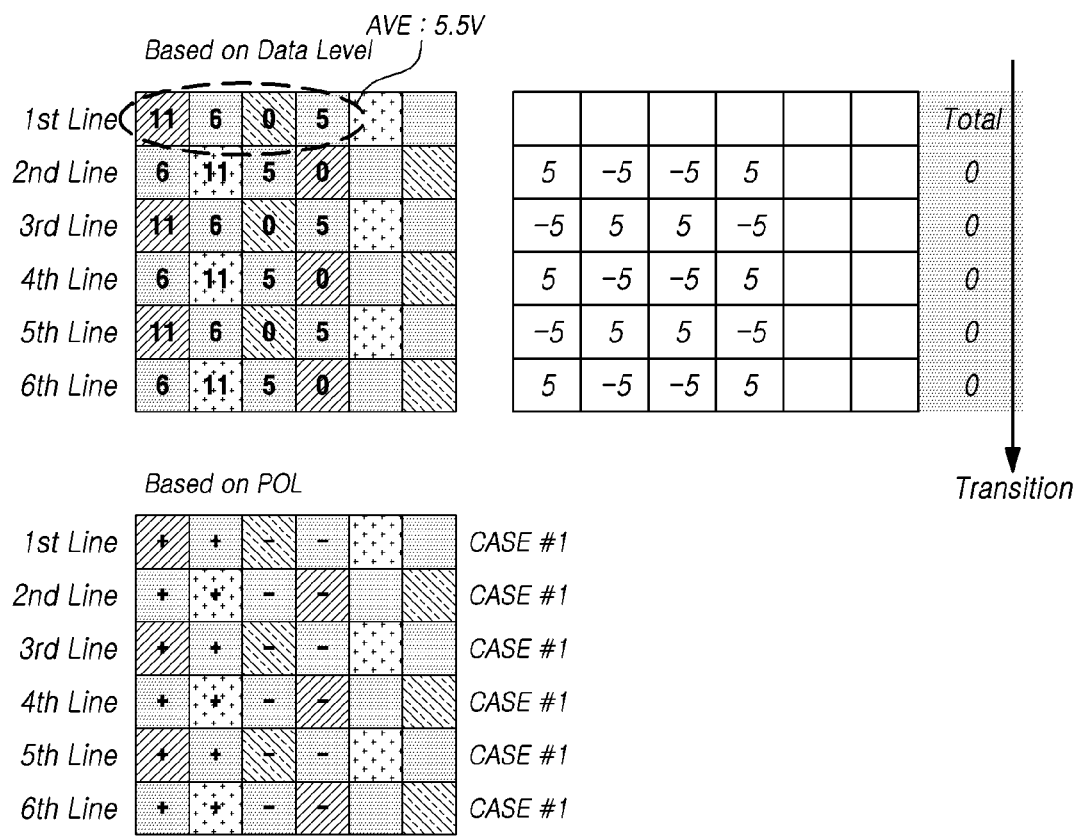

FIGS. 12 and 13 illustrate other examples of varying the inversion pattern with respect to four subpixels SP in the touch display device 100 according to embodiments.

Referring to FIG. 12, in a case in which the image data corresponding to the subpixels SP in the first row illustrated in FIG. 10 indicate the highest grayscale, the lowest grayscale, the highest grayscale, and the lowest grayscale, the data voltage Vdata according to the inversion pattern of the image data is determined. In addition, an average of the values of the determined data voltage Vdata is calculated.

For example, according to the inversion pattern of CASE #1 comprised of +, +, −, and −, the data voltage Vdata supplied to the subpixels SP in the first row is 11V, 6V, 0V, and 5V, with an average thereof being 5.5. In addition, the average value may be 5.5, 8, or 3, depending on the inversion pattern.

Here, the inversion pattern may be determined such that the average of the data voltage Vdata supplied to the four adjacent subpixels SP is a specific voltage.

That is, it is possible to set the transition value of the data voltage Vdata to be 0 by causing the averages of data voltage Vdata, supplied to the subpixels SP in the respective rows, to be the same.

Alternatively, the average of the data voltage Vdata may be set to be the same as a voltage applied to the common electrode, i.e. the touch electrodes TE.

Accordingly, one of the inversion patterns causing the average of the data voltage Vdata to be 5.5 can be determined to be the inversion pattern of the corresponding data voltage Vdata, and the average of the data voltage Vdata can be maintained to be the same as the voltage applied to the touch electrodes TE, so that fluctuations in the voltage of the touch electrodes TE are minimized.

As described above, the inversion pattern causing the average of the data voltage Vdata to be a specific voltage (e.g. 5.5V) may be determined for every row of subpixels SP. Examples of such inversion pattern determined in this manner may be illustrated in FIG. 13.

Referring to FIG. 13, the inversion pattern of the data voltage Vdata, supplied to the subpixels SP in the first row, may be CASE #1, and all of the inversion patterns of the data voltage Vdata, supplied to the subpixels SP in the remaining rows, may be CASE #1.

In addition, a total of the transition values of the data voltage Vdata may be 0, since the inversion pattern is determined such that the average of the data voltage Vdata, supplied to the subpixels SP in each row, is determined to be a specific voltage.

Accordingly, fluctuation in the voltage of the touch electrodes TE due to the transition of the data voltage Vdata can be minimized.

In addition, exemplary embodiments are configured to vary the inversion pattern in consecutive frames while minimizing fluctuations in the voltage of the touch electrodes TE due to the transition of the data voltage Vdata, thereby preventing deteriorations due to the application of the variable inversion pattern.

Figure 14:
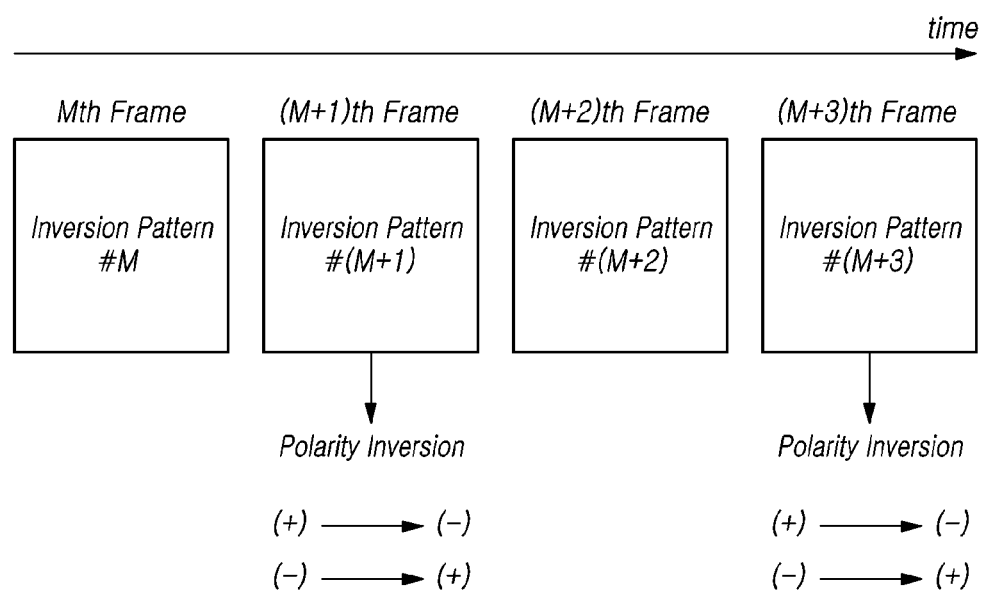
FIG. 14 illustrates an example of varying the inversion pattern with respect to frames in the touch display device according to embodiments.

FIG. 14 illustrates an example of varying the inversion pattern with respect to frames in the touch display device 100 according to embodiments.

Referring to FIG. 14, the inversion pattern of the data voltage Vdata, supplied to the subpixels through the data lines DL in each frame, may be determined such that a total of the transition values of the data voltage Vdata is 0. In addition, as in the above examples, the inversion pattern may be determined such that the total of the transition values of the data voltage Vdata is within a predetermined range from a specific value.

The data voltage Vdata may be supplied to the subpixels SP through the data lines DL according to the inversion pattern # M determined in the Mth frame. As the inversion pattern is determined such that the total of the transition values of the data voltage Vdata is 0, fluctuations in the voltage of the touch electrodes TE due to the transition of the data voltage Vdata can be minimized.

In addition, the data voltage Vdata may be supplied to the subpixels SP through the data lines DL according to the inversion pattern #(M+1) determined in the (M+1)th frame.

Here, at least some of the polarities of the data voltage Vdata according to the inversion pattern #(M+1) determined in the (M+1)th frame may be opposite to those of the data voltage Vdata according to the inversion pattern # M of the Mth frame.

That is, in a case in which the data voltage Vdata, supplied Ith to a specific data line DL in the Mth frame, has a positive (+) polarity, the data voltage Vdata supplied Ith to the corresponding data line DL in the (M+1)th frame may have a negative (−) polarity.

The inversion pattern #(M+1) of the (M+1)th frame may be produced by generating an inversion pattern such that a total of transition values of the data voltage Vdata according to image data of the (M+1)th frame is 0, and then, reversing all of the polarities of the generated inversion pattern.

Alternatively, the inversion pattern #(M+1) of the (M+1)th frame may be produced by setting the inversion pattern of the data voltage Vdata, supplied to some of the subpixels SP, to be reverse to that of the previous frame, and then, determining the inversion pattern of the data voltage Vdata supplied to the remaining subpixels SP. For example, it is possible to produce the inversion pattern having opposite polarities from those of the inversion pattern of the Mth frame by reversing the inversion pattern of four subpixels SP, and on the basis of the reversed inversion pattern, determining the inversion pattern of the (M+1)th frame.

Accordingly, the data voltage Vdata can be supplied according to the inversion pattern having opposite polarities in consecutive frames. In addition, the inversion pattern may be reversed in every odd-numbered frame or every even-numbered frame.

For example, the data voltage Vdata may be supplied according to the inversion pattern # M determined in the Mth frame, and the data voltage Vdata may be supplied according to the inversion pattern #(M+1), the polarities of which are reversed in the (M+1) frame. In addition, the data voltage Vdata may be supplied according to the inversion pattern #(M+2) determined in the (M+2)th frame, and the data voltage Vdata may be supplied according to the inversion pattern #(M+3), the polarities of which are reversed in the (M+3)th frame.

Accordingly, even in the case that the inversion pattern for the minimization of fluctuations in the voltage of the touch electrodes TE due to the transition of the data voltage Vdata is varied, any subpixel may not maintain a specific polarity in consecutive frames. In addition, in at least two consecutive frames among a plurality of frames, a specific polarity of any subpixel may be reversed, instead of being maintained. Accordingly, even in the case that an adaptive inversion pattern is used, deteriorations due to the display driving can be prevented.

In particular, even in the case that the image data of the current frame is the same as that of the previous frame, the polarities of the data voltage Vdata according to the inversion pattern of the current frame can be reversed from those of the data voltage Vdata according to the inversion pattern of the previous frame, so that deteriorations resulting from displaying a specific image pattern, a fixed image, or a still image can be prevented.

In addition, the polarity inversion of the inversion pattern as described above may be performed in at least one frame in a plurality of consecutive frames.

Figure 15:
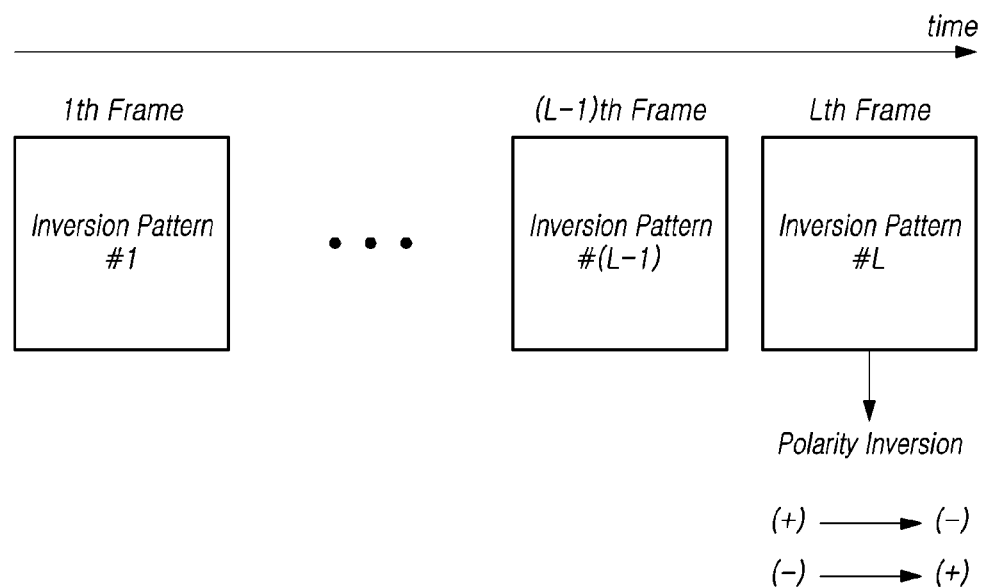
FIG. 15 illustrates another example of varying the inversion pattern with respect to frames in the touch display device according to embodiments.

FIG. 15 illustrates another example of varying the inversion pattern with respect to frames in the touch display device 100 according to embodiments.

Referring to FIG. 15, the touch display device 100 may determine the inversion pattern of the data voltage Vdata such that a total of the transition values of the data voltage Vdata in each frame is 0 or within a predetermined range from a specific value.

In addition, the inversion pattern in at least one frame among L number of consecutive frames may have polarities of opposite to those of the inversion pattern in the previous frame.

For example, in each frame among the first frame to the (L−1)th frame, the inversion pattern may be determined on the basis of a total of transition values of the data voltage Vdata. In addition, the inversion pattern # CL of the Lth frame may be determined to have opposite polarities to those of the data voltage Vdata according to the inversion pattern #(L−1) of the (L−1)th frame.

The inversion pattern # L of the Lth frame may be produced by generating the inversion pattern of the Lth frame and then reversing the entirety of the inversion pattern of the Lth frame. Alternatively, the inversion pattern # L of the Lth frame may be produced by setting the inversion pattern of some of subpixels SP of the Lth frame to be opposite to those of the (L−1)th frame and then determining the inversion pattern of the remaining subpixels SP.

As described above, according to embodiments, it is possible to minimize fluctuations in the voltage of the touch electrodes TE, due to the transition of the data voltage Vdata, by supplying the data voltage Vdata according to the adaptive inversion pattern. In addition, the polarities of the inversion pattern can be reversed in every odd-numbered or even-numbered frame or every specific number of frames can be include a frame, the inversion pattern of which has reversed polarities, so that the deterioration of a specific subpixel SP due to the application of the adaptive inversion pattern can be prevented.

Figure 16:
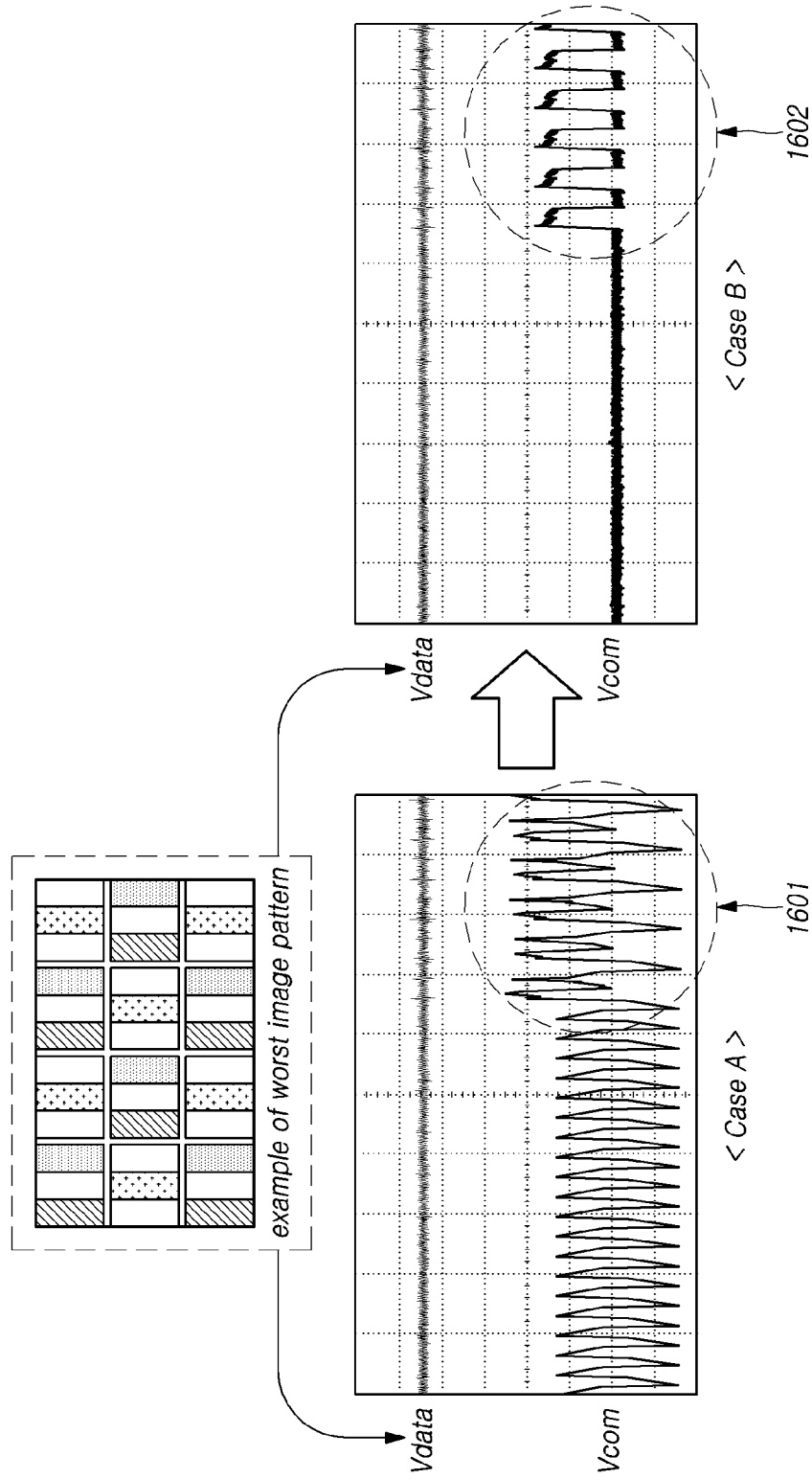
FIG. 16 illustrates an example waveform of a signal applied to a common electrode in the touch display device according to embodiments, in a case in which the inversion pattern is adaptively varied.

FIG. 16 illustrates an example waveform of a signal applied to a common electrode in the touch display device 100 according to embodiments, in a case in which the inversion pattern is adaptively varied.

Referring to FIG. 16, when the data voltage Vdata regarding an image pattern, in which a total of transition values of the data voltage Vdata is significant, is supplied, the common voltage Vcom applied to the touch electrodes TE, i.e. the common electrode, may fluctuate significantly (see 1601 in Case A). In this case, when the touch sensing is performed in a display driving period, fluctuations in the voltage of the touch electrodes TE may increase noise in the touch sensing signal TSS, thereby degrading the performance of the touch sensing.

In contrast, it is possible to reduce fluctuations in the common voltage Vcom (see 1602 in Case B) by determining the inversion pattern of the data voltage Vdata corresponding to the image pattern, on the basis of the transition values of the data voltage Vdata, and supplying the data voltage Vdata according to the determined inversion pattern.

Accordingly, exemplary embodiments can reduce fluctuations in the voltage of the touch electrodes TE due to the transition of the data voltage Vdata, thereby reducing noise in the touch sensing signal and improving the performance of the touch sensing.

The controller 140 can determine the inversion pattern of the data voltage Vdata by analyzing the pattern of the image data. In addition, the controller 140 can perform the inversion driving, in which the transition value of the data voltage Vdata is minimized, by transmitting an inversion control signal corresponding to the inversion pattern, together with a data signal corresponding to the image data, to the data driver circuit 130.

Figure 17:
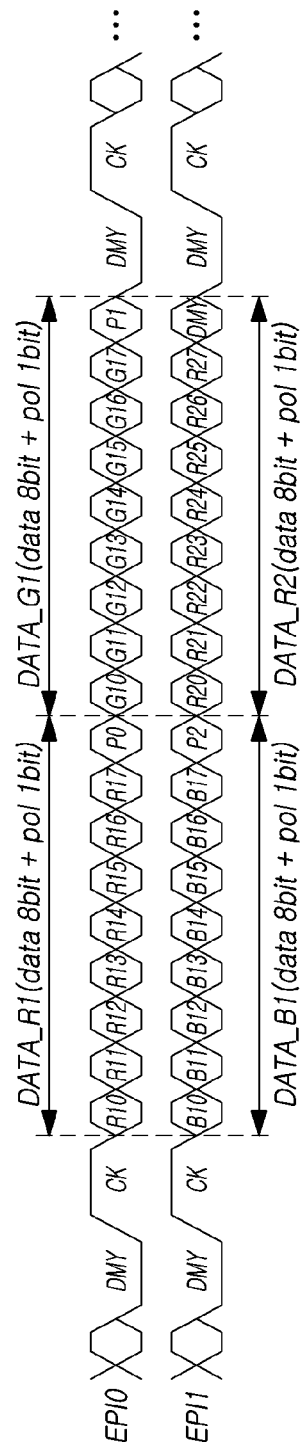
FIG. 17 illustrates example input data output to the data driver circuit by the controller in the touch display device according to embodiments.

FIG. 17 illustrates example input data output to the data driver circuit 130 by the controller 140 in the touch display device 100 according to embodiments.

Referring to FIG. 17, the controller 140 generates a data signal corresponding to image data received from an external source. In a case in which the image data is expressed by, for example, 256 grayscale levels, the controller 140 can convert the image data into an 8-bit data signal.

In addition, the controller 140 can transmit an inversion control signal instructing the inversion pattern, together with the data signal, for every four subpixels SP.

Since the number of the inversion patterns of the four subpixels SP is six (6), the inversion patterns may be represented by three-bit digital signals.

Accordingly, the controller 140 may add a one-bit signal to the data signal corresponding to each of the four subpixels SP, and may indicate one of the six inversion patterns with three bits P0, P1, and P2 of the four bits. In addition, the remaining one bit may be a dummy bit.

The controller 140 transmits the input data, including the data image corresponding to the image data and the inversion control signal corresponding to the inversion pattern, to the data driver circuit 130.

The data driver circuit 130 recognizes the grayscale from the data signal received from the controller 140 and recognizes the inversion pattern from the inversion control signal. In addition, the data driver circuit 130 may recognize the data voltage Vdata according to the grayscale and the inversion pattern, and may perform the inversion driving by outputting the corresponding data voltage Vdata.

Figure 18:
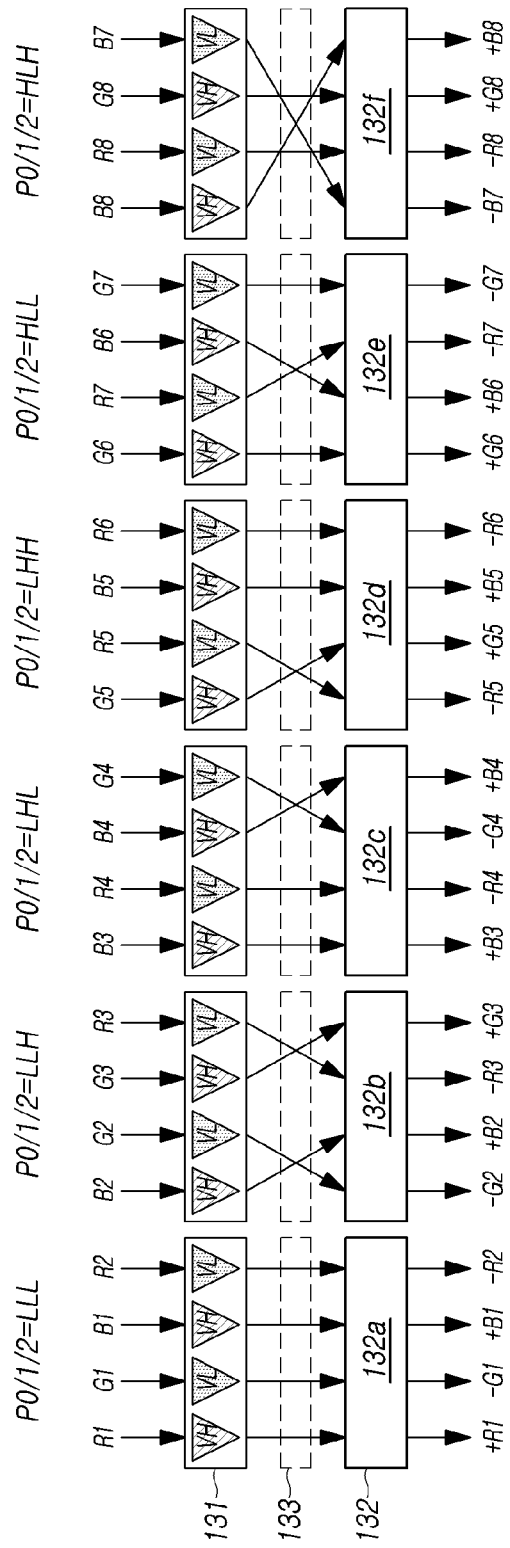
FIG. 18 illustrates an example method in which the data driver circuit outputs the data voltage according to the inversion pattern in the touch display device according to embodiments.

FIG. 18 illustrates an example method in which the data driver circuit 130 outputs the data voltage Vdata according to the inversion pattern in the touch display device 100 according to embodiments.

Referring to FIG. 18, the data driver circuit 130 may include an input buffer 131 to which the data voltage Vdata according to image data is input, an output buffer 132 outputting the data voltage Vdata to the data lines DL, and a switch 133 connecting the input buffer 131 and the output buffer 132 and controlling the connection between the input buffer 131 and the output buffer 132 according to the inversion pattern.

The data driver circuit 130 recognizes the grayscale from the data signal received from the controller 140, and recognizes the inversion pattern from the inversion control signal. In addition, the data driver circuit 130 recognizes the data voltage Vdata according to the corresponding grayscale and the polarities of the inversion pattern using a lookup table, and outputs the data voltage Vdata.

Here, the switch 133 controlling the connection between the input buffer 131 and the output buffer 132 may control the polarities of the data voltage Vdata output from the output buffer 132 in response to the inversion control signal.

For example, in a case in which an inversion control signal P0/1/2 is LLL, the data voltage Vdata is output according to polarities+, −, +, and − of the inversion pattern of CASE #3. Accordingly, the switch 133 can control the connection of the input buffer 131 and the output buffer 132 such that the polarities of four output data voltage Vdata R1, G1, B1, and R2, supplied to four adjacent subpixels SP, are +R1, −G1, +B1, and −R2, respectively.

Alternatively, in a case in which inversion control signal P0/1/2 is LLH, the data voltage Vdata is output according to polarities −, +, −, and + of the inversion pattern of CASE #4. Accordingly, the switch 133 can control connection of the input buffer 131 and the output buffer 132 such that the polarities of four output data voltage Vdata G2, B2, R3, and G3, supplied to four adjacent subpixels SP, are −G2, +B2, −R3, and +G3, respectively.

As described above, the data driver circuit 130 can vary the polarities of the data voltage Vdata supplied to the four adjacent subpixels SP in response to the inversion control signal received together with the data signal, so that the inversion pattern can be varied in each row of subpixels SP.

In addition, the transition values of the data voltage Vdata can be reduced by varying the inversion pattern as described above, so that fluctuations in the voltage of the touch electrodes TE due to the transition of the data voltage Vdata can be minimized.

Figure 19:
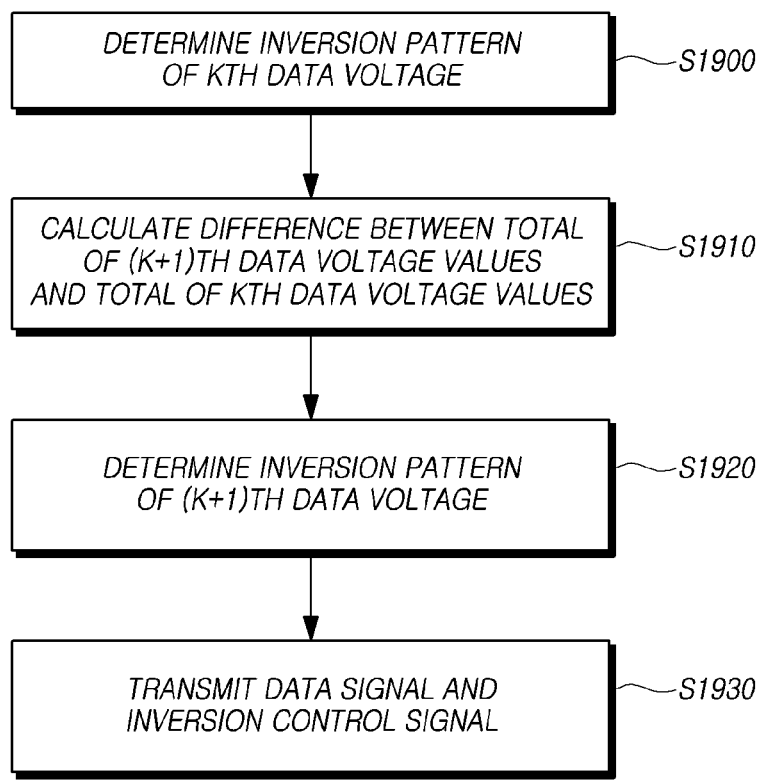
FIG. 19 illustrates an example method of driving the controller according to embodiments.

FIG. 19 illustrates an example method of driving the controller 140 according to embodiments.

Referring to FIG. 19, the controller 140 determines an inversion pattern by receiving image data from an external source and analyzing the pattern of the received image data.

Specifically, in S1900, the controller 140 determines the inversion pattern of the Kth data voltage Vdata supplied to 2N number of adjacent subpixels SP.

Here, the inversion pattern of the Kth data voltage Vdata may be determined on the basis of a difference from the (K−1)th data voltage Vdata, or may be determined on the basis of an average of the Kth data voltage Vdata.

The controller 140 may calculate a difference between a total of values of the (K+1)th data voltage Vdata and a total of values of the Kth data voltage Vdata in S1910, and determine the inversion pattern of the (K+1)th data voltage Vdata, on the basis of the difference, in S1920.

Alternatively, the inversion pattern may be determined on the basis of an average of the (K+1)th data voltage Vdata.

The controller 140 transmits a data signal corresponding to image data and an inversion control signal corresponding to the determined inversion pattern to the data driver circuit 130 in S1930. Due to this processing, the inversion driving able to reduce the transition of the data voltage Vdata can be performed.

As set forth above, according to exemplary embodiments, a signal modulated on the basis of the touch driving signal TDS applied to the touch electrodes TE may be supplied to the gate lines GL and the data lines DL, so that the display driving and the touch sensing can be simultaneously performed.

In addition, it is possible to reduce the transition value of the data voltage Vdata by varying the inversion pattern of the data voltage Vdata, in consideration of the transition value of the data voltage Vdata supplied through the data lines DL.

Accordingly, it is possible to minimize fluctuations in the voltage of the touch electrodes TE due to the transition of the data voltage Vdata, so that the performance of the touch sensing can be improved even in the case that the display driving and the touch sensing are simultaneously performed. In addition, it is possible to reverse the polarity of the inversion pattern determined with respect to frames, so that a specific subpixel SP is not deteriorated due to adaptive determination of the inversion pattern.

The foregoing descriptions and the accompanying drawings have been presented in order to explain certain principles of the present disclosure by way of example. A person having ordinary skill in the art to which the present disclosure relates could make various modifications and variations without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

What is claimed is:

1. A touch display device comprising:
a touch display panel on or within which a plurality of touch electrodes are disposed;
a plurality of data lines disposed in the touch display panel; and
a data driver circuit configured to supply a data voltage to the plurality of data lines,
wherein the data voltage supplied to N number of data lines of 2N number of adjacent data lines among the plurality of data lines by the data driver circuit is higher than a voltage applied to the touch electrodes, and the data voltage supplied to remaining data lines of the 2N number of adjacent data lines among the plurality of data lines by the data driver circuit is lower than the voltage applied to the touch electrodes during a frame according to a variation in an inversion pattern performed with respect to the 2N number of adjacent subpixels by a controller, and
wherein the controller determines the inversion pattern in order that a transition value between a total sum of values of a Kth data voltage supplied at a Kth time to the 2N number of adjacent data lines, and a total sum of values of a (K+1)th data voltage supplied at a (K+1)th time to the 2N number of adjacent data lines is within a predetermined range from zero during the frame.

2. The touch display device according to claim 1, wherein each of an average of the values of the Kth data voltage supplied at the Kth time to the 2N number of adjacent data lines, and an average of the values of the (K+1)th data voltage supplied at the (K+1)th time to the 2N number of adjacent data lines is within the predetermined range from a preset value.

3. The touch display device according to claim 2, wherein each of an average of the values of the Kth data voltage supplied at the Kth time to the 2N number of adjacent data lines, and an average of the values of the (K+1)th data voltage supplied at the (K+1)th time to the 2N number of adjacent data lines is within the predetermined range from the voltage applied to the touch electrodes.

4. The touch display device according to claim 1, wherein the data driver circuit receives input data, including a data signal corresponding to image data and an inversion control signal, from an external source.

5. The touch display device according to claim 4, wherein the N number of data lines, of the 2N number of adjacent data lines, to which the data voltage higher than the voltage applied to the touch electrodes is applied, differ depending on the inversion control signal.

6. The touch display device according to claim 1, wherein the data driver circuit includes:
an input buffer to which a data voltage corresponding to a data signal received from an external source is input;
an output buffer configured to output the data voltage to the plurality of data lines; and
a switch corresponding to the 2N number of adjacent data lines, and configured to control a connection between the input buffer and the output buffer.

7. The touch display device according to claim 1, wherein the voltage applied to the touch electrodes comprises an AC voltage,
at least a portion of the data voltage applied to the N number of data lines of the 2N number of adjacent data lines, is higher than a high level voltage of the voltage applied to the touch electrodes, and
at least a portion of the data voltage applied to the N number of remaining data lines, is lower than a low level voltage of the voltage applied to the touch electrodes.

8. The touch display device according to claim 1, wherein an Ith data voltage supplied at an Ith time to a data line of the 2N number of adjacent data lines in an Mth frame is higher than the voltage applied to the touch electrodes, and
the Ith data voltage supplied at the Ith time to the data line of the 2N number of adjacent data lines in an (M+1)th frame is lower than the voltage applied to the touch electrodes.

9. The touch display device according to claim 8, wherein the data driver circuit receives a data signal corresponding to image data from an external source, and the data signal corresponding to the image data of the Mth frame is the same as the data signal corresponding to the image data of the (M+1)th frame.

10. The touch display device according to claim 1, wherein an Ith data voltage supplied at an Ith time to a data line of the 2N number of adjacent data lines in at least one frame among L number of consecutive frames is higher than the voltage applied to the touch electrodes, and
the Ith data voltage supplied at the Ith time to the data line in a previous frame is lower than the voltage applied to the touch electrodes.

11. The touch display device according to claim 1, wherein an Ith data voltage supplied at an Ith time to a single data line of the 2N number of adjacent data lines in a first frame of at least two consecutive frames is higher than the voltage applied to the touch electrodes, and
the Ith data voltage supplied at the Ith time to the single data line in a second frame is lower than the voltage applied to the touch electrodes.

12. A data driver circuit comprising:
an input buffer to which a data voltage corresponding to a data signal received from an external source is input;
an output buffer configured to output the data voltage to data lines; and
a switch configured to control a connection between the input buffer and the output buffer,
wherein the data voltage is determined by an inversion pattern in order that a transition value between a total sum of values of a Kth data voltage output at a Kth time to 2N number of adjacent data lines, and a total sum of values of a (K+1)th data voltage output at a (K+1)th time to the 2N number of adjacent data lines, is within a predetermined range from zero during a frame.

13. The data driver circuit according to claim 12, wherein a data voltage output to N number of data lines of the 2N number of adjacent data lines is higher than a specific voltage, and
a data voltage output to N number of remaining data lines of the 2N number of adjacent data lines is lower than the specific voltage.

14. The data driver circuit according to claim 13, wherein each of an average of the values of the Kth data voltage output at the Kth time to the 2N number of adjacent data lines, and each of an average of the values of the (K+1)th data voltage output at the (K+1)th time to the 2N number of adjacent data lines is within the predetermined range from a preset value.

15. The data driver circuit according to claim 13, wherein the switch corresponds to the 2N number data lines, and
wherein the N number of data lines, to which a data voltage higher than the specific voltage is applied, are changed depending on the switch.

16. The data driver circuit according to claim 13, wherein an Ith data voltage supplied at the Ith time to a data line of the 2N number of adjacent data lines in an Mth frame is higher than the specific voltage, and the Ith data voltage supplied at the Ith time to the data line of the 2N number of adjacent data lines in an (M+1)th frame is lower than the specific voltage.

17. A method of driving a controller, comprising:
receiving image data from an external source;
determining an inversion pattern of a Kth data voltage at a Kth time depending on the image data;
calculating a transition value between a total sum of values of a (K+1)th data voltage at a (K+1) time and a total sum of values of the Kth data voltage at the Kth time, using inversion pattern candidates of the (K+1)th data voltage at the (K+1) time and the inversion pattern of the Kth data voltage at the Kth time during a frame;
determining an inversion pattern of the (K+1)th data voltage at the (K+1)th time based on the transition value; and
outputting input data, including a data signal corresponding to the image data and an inversion control signal corresponding to the inversion pattern.

18. The method according to claim 17, wherein the inversion pattern of the (K+1)th data voltage at the (K+1)th time is determined as an inversion pattern by which the transition value is within a predetermined range from a preset value among the inversion pattern candidates of the (K+1)th data voltage at the (K+1)th time as the inversion pattern of the (K+1)th data voltage at the (K+1)th time.

19. The method according to claim 17, further comprising determining an inversion pattern of a (K+2)th data voltage at a (K+2)th time using inversion pattern candidates of the (K+2)th data voltage at the (K+2)th time and the inversion pattern of the (K+1)th data voltage at the (K+1)th time.

20. The method according to claim 17, wherein at least one of the inversion control signals included in 2N number of input data comprises a dummy signal.

* * * * *